(12) United States Patent
Daschiel et al.

(10) Patent No.: US 11,554,632 B2
(45) Date of Patent: Jan. 17, 2023

(54) AIR VENT FOR INTRODUCING AIR INTO A MOTOR VEHICLE INTERIOR

(71) Applicant: Bayerische Motoren Werke Aktiengesellschaft, Munich (DE)

(72) Inventors: Gertraud Daschiel, Munich (DE); Stefan Zemsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 233 days.

(21) Appl. No.: 17/043,843

(22) PCT Filed: May 29, 2019

(86) PCT No.: PCT/EP2019/064089
§ 371 (c)(1),
(2) Date: Sep. 30, 2020

(87) PCT Pub. No.: WO2019/233877
PCT Pub. Date: Dec. 12, 2019

(65) Prior Publication Data
US 2021/0122212 A1    Apr. 29, 2021

(30) Foreign Application Priority Data
Jun. 7, 2018    (DE) .................... 10 2018 209 060.2

(51) Int. Cl.
*B60H 1/34*    (2006.01)
*B60H 1/00*    (2006.01)

(52) U.S. Cl.
CPC ..... *B60H 1/00685* (2013.01); *B60H 1/00671* (2013.01); *B60H 1/3407* (2013.01); *B60H 1/3442* (2013.01)

(58) Field of Classification Search
CPC ............ B60H 1/00671; B60H 1/00685; B60H 1/3442; B60H 1/3414; B60H 1/34
(Continued)

(56) References Cited

U.S. PATENT DOCUMENTS

| 3,602,126 A | 8/1971 | Breitschwerdt |
| 5,127,876 A * | 7/1992 | Howe .................. B60H 1/3442 454/286 |

(Continued)

FOREIGN PATENT DOCUMENTS

| CN | 103363639 B | 1/2016 |
| DE | 1 755 559 A1 | 12/1971 |

(Continued)

OTHER PUBLICATIONS

International Search Report (PCT/ISA/210) issued in PCT Application No. PCT/EP2019/064089 dated Sep. 3, 2019 with English translation (seven pages).

(Continued)

*Primary Examiner* — Ko-Wei Lin
(74) *Attorney, Agent, or Firm* — Crowell & Moring LLP

(57) ABSTRACT

An air vent for introducing air into a motor vehicle interior includes an inlet opening, through which an incoming air flow enters the air vent, an outlet opening, through which an air flow exits the air vent, and an adjuster, which is fluidically and operatively connected to the inlet opening and the outlet opening. The adjuster has at least one entry, which is fluidically and operatively connected to the inlet opening. The adjuster has at least two exits, which are spaced apart from each other and from each of which an open air stream exits into the outlet opening. The adjuster is designed to align the open air streams to a focal point and the adjuster is designed to be located outside of a field of view of the motor vehicle interior.

12 Claims, 5 Drawing Sheets

(58) Field of Classification Search
USPC .................................. 454/152, 154, 155
See application file for complete search history.

(56) References Cited

U.S. PATENT DOCUMENTS

| | | | | |
|---|---|---|---|---|
| 5,218,998 | A * | 6/1993 | Bakken | F24F 13/12 454/324 |
| 5,328,152 | A * | 7/1994 | Castle | B60H 1/3442 74/25 |
| 5,421,775 | A * | 6/1995 | Honda | F24F 7/00 454/274 |
| 5,427,146 | A * | 6/1995 | Bakken | F24F 13/12 137/625.33 |
| 6,527,194 | B1 * | 3/2003 | Burke | F16K 47/04 137/625.38 |
| 7,189,158 | B2 * | 3/2007 | Motszko | B60H 1/00857 454/258 |
| 7,431,638 | B2 * | 10/2008 | Natsume | B60H 1/00692 454/324 |
| 10,281,189 | B2 * | 5/2019 | Hiller | F16K 17/0413 |
| 10,786,840 | B1 * | 9/2020 | Secor | F24F 11/0001 |
| 2012/0129443 | A1 * | 5/2012 | Bastow | F24F 13/16 454/258 |
| 2014/0335774 | A1 * | 11/2014 | Dorland | B60H 1/00685 454/139 |
| 2015/0217629 | A1 * | 8/2015 | Kawanishi | B60H 1/3414 454/152 |
| 2016/0250909 | A1 * | 9/2016 | Schneider | B60H 1/3421 454/155 |
| 2016/0361979 | A1 * | 12/2016 | Brinas | B60H 1/3442 |
| 2017/0057328 | A1 * | 3/2017 | Sano | B60H 1/3442 |
| 2017/0115041 | A1 * | 4/2017 | Humboldt | F16K 47/04 |
| 2017/0190240 | A1 * | 7/2017 | Paris | B60H 1/00564 |
| 2018/0056756 | A1 * | 3/2018 | Schaal | F24F 13/072 |
| 2018/0319255 | A1 * | 11/2018 | Bastian | B60H 1/00564 |
| 2018/0334015 | A1 * | 11/2018 | Doll | B60H 1/3414 |
| 2019/0009650 | A1 * | 1/2019 | Yueksel | B60H 1/3414 |

FOREIGN PATENT DOCUMENTS

| | | |
|---|---|---|
| DE | 197 07 405 A1 | 8/1998 |
| DE | 10 2010 038 711 A1 | 2/2012 |
| DE | 20 2014 002 057 U1 | 7/2015 |
| DE | 10 2017 115 012 B3 | 5/2018 |
| EP | 1 985 482 A2 | 10/2008 |
| JP | 62-228833 A | 10/1987 |
| JP | 2007-196942 A | 8/2007 |

OTHER PUBLICATIONS

German-language Written Opinion (PCT/ISA/237) issued in PCT Application No. PCT/EP2019/064089 dated Sep. 3, 2019 (seven pages).

German-language Search Report issued in German Application No. 10 2018 209 060.2 dated Feb. 25, 2019 with partial English translation (12 pages).

* cited by examiner

AIR VENT FOR INTRODUCING AIR INTO A MOTOR VEHICLE INTERIOR

BACKGROUND AND SUMMARY OF THE INVENTION

The present invention relates to an air vent for introducing air into a motor vehicle interior and to a motor vehicle equipped with the air vent.

As is generally known, there are air vents which are provided for introducing air-conditioned air or air which has not been air-conditioned into vehicle interiors. Such air vents are located in particular on dashboards, pillar coverings (in particular on B pillars of motor vehicles), side storage trays, center consoles or roof linings and each have at least one inlet opening, through which an incoming airflow enters the air vents, and an outlet opening, through which an airflow exits the air vent into the vehicle interior. For the purpose of increasing the comfort of a vehicle occupant in the motor vehicle interior, the air vent furthermore has an adjuster, which is operatively connected fluidically to the inlet opening and the outlet opening in order to adjust the direction or the volumetric flow of the airflow emerging from the air vent.

It is the object of the present invention to specify means with which an air vent having an adjuster can be realized.

This object is achieved by an air vent according to the independent claims. Advantageous refinements are specified in the dependent claims.

The air vent according to the invention for introducing air into a vehicle interior first of all comprises an inlet opening, through which an incoming airflow enters the air vent. The inlet opening can be connected to a fan and/or to an air-conditioner (HVAC) from which air-conditioned air, consequently air which has been cooled or heated, or air which has not been air-conditioned is provided as the incoming airflow into the air vent. Furthermore, the air vent according to the invention comprises an outlet opening, through which the air which has flowed in exits the air vent as a directed airflow into the motor vehicle interior. Finally, the air vent according to the invention comprises an adjuster, which is operatively connected fluidically to the inlet opening and the outlet opening in order to adjust the direction and/or the volumetric flow of the airflow leaving the air vent.

For this purpose, it is first of all provided according to the invention that the adjuster has at least one entry, which is operatively connected fluidically to the inlet opening, and therefore the air entering the air vent can be reliably supplied to the adjuster. Furthermore, the adjuster has at least two spaced-apart exits, from each of which an open air jet exits into the outlet opening, and therefore a directed airflow can reliably flow out into the motor vehicle interior.

Finally, the adjuster is firstly designed, for the purpose of increasing the comfort of a motor vehicle occupant, to align the open air jets with a focal point and is designed, secondly, for improving the aesthetic effect of the air vent according to the invention, to be located outside a field of view of the motor vehicle interior. It should be noted that the term "focal point" should not be understood solely as meaning a point in the mathematical sense. On the contrary, this term also includes lines, planes and spaces in which air emerging from the exits of the adjuster combines to form an airflow. Consequently, air which has been air-conditioned or air which has not been air-conditioned can be focused in an advantageous manner or introduced diffusely into the motor vehicle interior.

Overall, it is therefore made possible by means of the device according to the invention to divide an incoming airflow flowing into the air vent into various outgoing airflows. The outgoing airflows move within one plane when there are two exits and three-dimensionally when there are at least three exits, the outgoing airflows, upon suitable adjustment and/or configuration of the exits, meeting in particular at a focal point.

According to a preferred embodiment, the air vent is distinguished in that the adjuster has a first disk which is adjacent to the entry, with first passage openings spaced apart radially from one another, and a second disk which is adjacent to said first disk, with spaced-apart second passage openings forming the exits. The first disk and/or the second disk are mounted rotatably about a common axis in such a manner that the entry of at least one of the first passage openings and/or of at least one of the second passage openings are arranged optionally in alignment, partially in alignment or not in alignment with one another. A comparatively simple design of the air vent according to the invention, with which an action increasing the comfort of a vehicle occupant is obtained, is thereby provided in an advantageous manner.

In an advantageous manner, between the first disk and the second disk a third disk is located about the previously mentioned axis of rotation, the third disk, for its part, being mounted so as to be optionally rotatable. The third disk comprises at least two third passage openings, which are spaced apart radially from one another, wherein at least one of the third passage openings is arranged optionally in alignment, partially in alignment or not in alignment with at least one of the first passage openings and/or at least one of the second passage openings. This makes it possible to more precisely coordinate the airflow emerging from the air vent.

Alternatively or cumulatively with respect thereto, it is possible that the first disk is operatively connected to an inlet duct which is located upstream and has the inlet opening, and the second disk is operatively connected downstream to an outlet duct having the outlet opening.

In order to further improve the precision of the airflow emerging from the air vent into the motor vehicle interior, in particular the setting of the focal point, it is provided that at least one of the first passage openings has a first longitudinal profile running in the longitudinal direction of the first disk, and/or at least one of the second passage openings has a second longitudinal profile running in the longitudinal direction of the second disk, and/or at least one of the third passage openings has a third longitudinal profile running in the longitudinal direction of the third disk.

The first passage openings, the second passage openings and the optional third passage openings can in each case differ in shape. This means that one of the passage openings, some of the passage openings or all of the passage openings can differ in geometry. This geometry can comprise in particular circular openings or through grooves arranged on a circular path with a length between substantially one third and one quarter of the circumference of the respective disk.

According to a further preferred embodiment of the air vent according to the invention, it is provided that the adjuster has a body, on the outer side of which the entry and the at least two exits are spaced apart from one another and are fluidically connected to one another by means of a duct located in the body, wherein at least a part of the outer side is formed spherically and is mounted pivotably in a bearing shell in such a manner that the exits having openings located in the bearing shell are arranged optionally in alignment, partially in alignment or not in alignment with one another.

A comparatively simple design of the air vent according to the invention, with which an action increasing the comfort of a vehicle occupant is obtained, is thereby provided in an advantageous manner.

In an advantageous manner, the previously disclosed adjuster comprises a body having at least two entries which are each operatively connected fluidically to an exit, wherein at least one entry has a closure which optionally entirely or partially opens and closes the entry. Depending on the adjustment of the respective closure, the volumetric flow and/or the direction of the airflow emerging from the air vent can therefore be adjusted in a simple manner.

In principle, the closure can be moved in any suitable manner, in particular in a rotary manner. However, a technically particularly simple design of the closure is provided if the closure is in the form of a tappet.

According to a further preferred embodiment of the air vent according to the invention, it is provided that the adjuster has at least two radially spaced-apart entries and a flow body which is located upstream with respect to the entries and which is designed to optionally entirely, partially or not direct the incoming airflow to at least one of the entries. A comparatively simple design of the air vent according to the invention, with which an action increasing the comfort of a vehicle occupant is obtained, is thereby provided in an advantageous manner.

In an advantageous manner, the previously mentioned flow body has a base section and an incident flow section upstream with respect thereto, and is designed to be movable in a translatory and/or rotary manner. By this means, the air vent according to the invention has an adjuster which is particularly simple to produce.

This is also true if the flow body is designed as a rotation body which is movable transversely with respect to the flow direction of the airflow and has a dome located upstream and a bearing section located downstream.

For the purpose of a further improvement in the adjustment of the focal point, it is provided that the flow body is at least partially surrounded by a duct having at least one movable wall. Depending on the adjustment of this duct wall, the incident flow of the flow body can be optimally adjusted in an advantageous manner.

It goes without saying that one, some or all of the exits is or are aligned with one another, and therefore a movement of the open jet or of the open jets with respect to one another is assisted. Furthermore, according to a further preferred embodiment, the passage openings, the outlet ducts or the ducts at the respective ends thereof can likewise be aligned with one another.

The object presented further above is likewise achieved by a motor vehicle which has at least one air vent of the type previously disclosed. The previously described advantages apply appropriately. In an advantageous manner, at least one air vent according to the invention is arranged on a dashboard, located in the motor vehicle according to the invention, pillar covering (in particular a B pillar of a motor vehicle), side storage tray, center console and/or a roof lining. The arrangement is preferably undertaken in such a manner that the focal point is located in the vicinity of, or on at least one person in the motor vehicle or on an object located in the motor vehicle.

A detailed, non-prejudicial, in particular non-limiting, description of exemplary embodiments of the present invention is given below with reference to the attached figures, which are not to scale. Identical elements contained in the figures are provided with the same reference signs.

DETAILED DESCRIPTION OF THE DRAWINGS

Figure 1A:
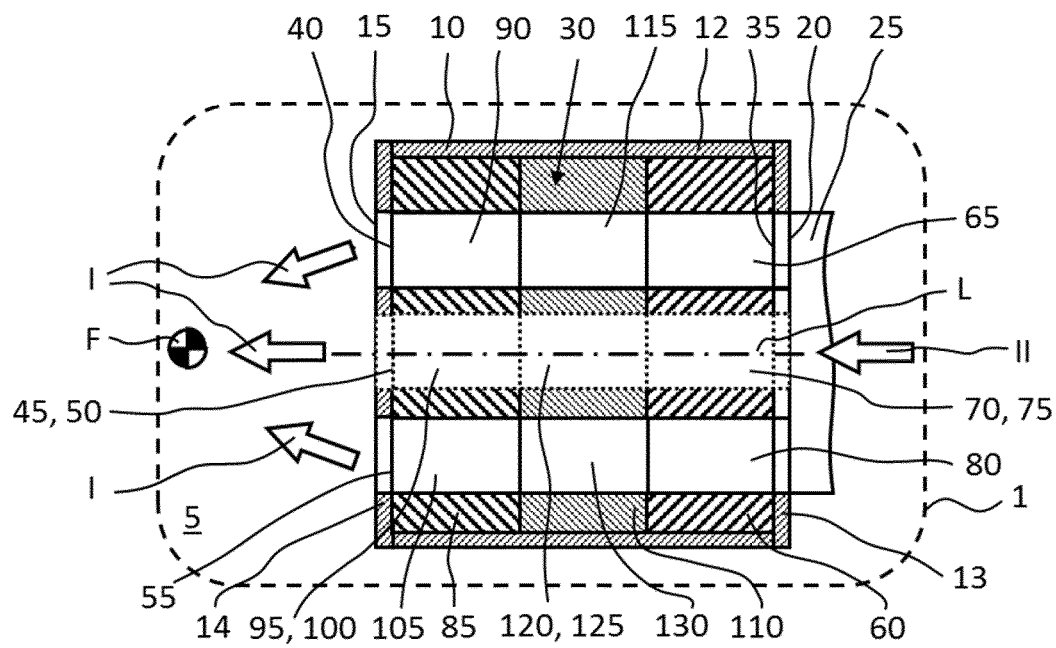
FIG. 1A is a symbolic sectional view through a motor vehicle according to the invention which is equipped with a first embodiment of an air vent according to the invention.

FIG. 1A illustrates a motor vehicle 1 symbolically in a longitudinal sectional view, in the motor vehicle interior 5 of which an air vent 10 for introducing air, symbolized by means of the arrows I, in the form of a directed or non-directed airflow or open air jet is located. In the embodiment shown here, the air vent 10 is designed in such a manner that the air I flowing out of it, specifically through an outlet opening 15, meets at a virtual focal point F. The air vent 10 can be provided in a manner known per se on, not illustrated specifically here, a dashboard, a center console, an interior trim panel, a roof lining or similar other components located in the motor vehicle interior 5.

On its right side in FIG. 1A, the air vent 10 is connected with an inlet opening 20 to an incoming air duct 25, through which an incoming airflow II can flow. The incoming airflow II can comprise air which has been air-conditioned or air which has not been air-conditioned and which is transported from an air-conditioning system (not shown here) or HVAC device and/or from a fan (not shown here) in the direction of the air vent 10. It should be noted that, in the embodiment shown here, only one inlet opening 20 is provided. However, it is likewise possible to provide more than one inlet opening 20 in order to transport one or more incoming airflows II into the air vent 10.

So that the incoming airflow II is capable of flowing in the desired manner in the direction of the focal point F, an adjuster 30 is provided in the air vent 10. The adjuster 30, on its right side in FIG. 1A, has an entry 35 which, according to the embodiment shown here, is adjacent to the inlet opening 20 and is fluidically connected thereto.

In principle, the adjuster 30 can have at least two exits, out of each of which an open air jet I can flow. However, according to the exemplary embodiment present here, the adjuster 30 shown in FIG. 1A has, on the left side, four exits 40, 45, 50 and 55, of which the exits 45 and 50 are located on the other side and this side respectively of the plane of the paper and from each of which an open jet I enters the outlet opening 15.

The adjuster 30 has a first disk 60 which is adjacent to the incoming air duct 20 and has passage openings 65, 70, 75 and 80, which are spaced apart radially from one another and are in the form of ducts in the axial direction, as will be explained further with reference to FIG. 1B. The right ends of the passage openings 65, 70, 75 and 80, which ends are shown in FIG. 1A, therefore in each case form the entry 35 according to this embodiment.

The adjuster 30 furthermore has a second disk 85 which is adjacent to the outlet opening 15 and the passage openings 90, 95, 100 and 105 of which, which are likewise in the form of ducts in the axial direction, are spaced apart radially from one another, as will be explained further with reference to FIG. 1D. The passage openings 95, 100 are located on the other side or on this side of the plane of the paper. Consequently, the left ends of the passage openings 90, 95, 100 and 105, which ends are shown in FIG. 1A, form the four exits 40, 45, 50 and 55 which are adjacent to the exit opening 15.

Finally, a third disk 110 is located directly between the first disk 60 and the second disk 85, touching the latter, which third disk, for its part, has passage openings 115, 120, 125 and 130 which are spaced apart radially from one another and are in the form of ducts in the axial direction, as will be explained further with reference to FIG. 1C. The passage openings 120, 125 are located on the other side and on this side respectively of the plane of the paper.

The first disk 60, the second disk 85 and the third disk 110 are arranged coaxially with respect to one another so as to be pivotable about a common axis of rotation L such that the passage openings 65, 115 and 90, the passage openings 70, 120 and 95, the passage openings 75, 125 and 100 and/or the passage openings 80, 130 and 105 are oriented in complete alignment (as shown in FIG. 1A), in partial alignment or not in alignment with one another in order to completely, partially or not permit the incoming airflow II to pass through in each case the first disk 60, the second disk 85 and the third disk 110. The incoming airflow II is thus divided, when passage is permitted through the passage openings 65, 115 and 90, into a first partial airflow or open jet I, when passage is permitted through the passage openings 70, 120 and 95, into a second partial airflow or open jet I (which is located on the other side of the plane of the paper), when passage is permitted through the passage openings 75, 125 and 100, into a third partial airflow or open jet I (which is located on this side of the plane of the paper) and/or, when passage is permitted through the passage openings 80, 130 and 105, into a fourth partial airflow or open jet I. Depending on the position of said disks 60, 85 and 110, the partial airflows or open jets I mentioned are combined with one another in such a manner that the desired focal point F can be acted upon with air.

The air vent 10 shown in FIG. 1A has a housing 12 surrounding the first disk 60, the second disk 85 and the third disk 110 in the radial direction and a right housing cover 13 which axially secures said disks and in which the inlet opening 20 is located, and a left housing cover 13 in which the outlet opening 15 is located. The two housing covers 13, 14 have a small length in comparison to the axial extent of the air vent 10 in order to permit the incoming airflow II to enter or the outgoing airflow I to exit in a manner as free from interference as possible. It is also possible to omit one of the two housing covers 13, 14 or both housing covers 13, 14 if axial securing of the first disk 60 and of the second disk 85 is ensured. In such a case, the passage openings 65, 70, 75 and 80 are formed in a manner functionally integrated with the incoming air duct 25 and/or the second passage openings 90, 95, 100 and 105 are formed in a manner functionally integrated with the outlet opening 15.

Figure 1B:
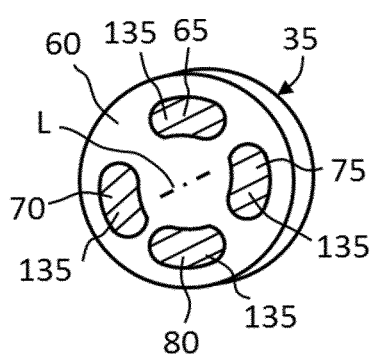
FIGS. 1B to 1D illustrate a perspective top view of various components of the air vent shown in FIG. 1A.

The first disk 60 is shown once again in more detail in a perspective top view in FIG. 1B. Passage openings 65, 70, 75 and 80 are arranged in a radially distributed manner on the first disk 60, which is oriented orthogonally with respect to the axis of rotation L, said passage openings, in each case on the surface remote from the entry 35, each having a cross section in the manner of a segment of a circle and being designed as an elongated hole. Within the first disk 60, they each form an inlet channel 135, the walls of which run parallel to the axis of rotation L. However, this is not necessarily the case; on the contrary, the walls of an inlet duct 135 and of a passage opening 65, 70, 75 and 80 may also not run parallel to the axis of rotation L and/or may run in a staggered manner in relation thereto and/or obliquely. In principle, the passage openings 65, 70, 75 and 80 can be oriented in a manner spaced apart uniformly radially from one another. As can be gathered from the exemplary embodiment according to FIG. 1B, it is, however, also possible to distribute the passage openings 65, 70, 75 and 80 non-uniformly over the first disk 60. Furthermore, it is possible to provide a circular cross section instead of the cross section in the manner of a segment of a circle for one or all of the passage openings 65, 70, 75 and 80.

Figure 1C:
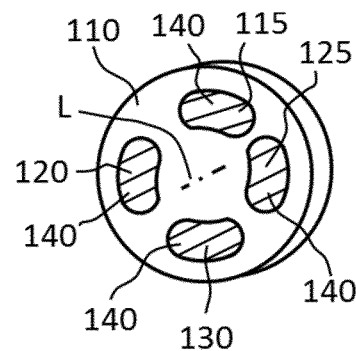

The third disk 110 is shown once again in more detail in a perspective top view in FIG. 1C. Passage openings 115, 120, 125 and 130 which each have a cross section in the manner of a segment of a circle and are in the form of an elongated hole are arranged in a radially distributed manner over the third disk 110, which is oriented orthogonally with respect to the axis of rotation L. Within the third disk 110, said passage openings each form a passage duct 140, the walls of which run parallel to the axis of rotation L. However, this is not necessarily the case; on the contrary, the walls of a passage duct 140 and of a passage opening 115, 120, 125 and 130 may also not run parallel to the axis of rotation L and/or may run in a staggered manner in relation thereto and/or obliquely. In principle, the passage openings 115, 120, 125 and 130 may be oriented in a manner spaced apart uniformly radially from one another. As can be gathered from the exemplary embodiment according to FIG. 1C, it is, however, also possible to distribute the passage openings 115, 120, 125 and 130 radially non-uniformly over the third disk 110. Furthermore, it is possible to provide a circular cross section instead of the cross section in the manner of a segment of a circle for one or all of the passage openings 115, 120, 125 and 130.

Figure 1D:
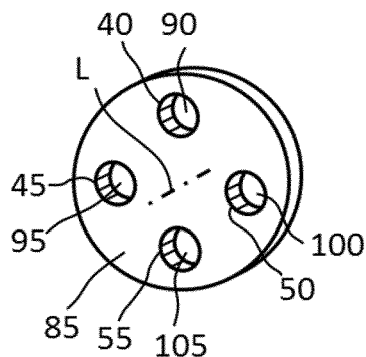

The second disk 85 is shown once again in more detail in a perspective top view in FIG. 1D. Passage openings 90, 95, 100 and 105 which each have a circular cross section are arranged in a radially distributed manner over the second disk 85, which is oriented orthogonally with respect to the axis of rotation L. Within the second disk 85, said passage openings each form an outlet duct 145, the walls of which run parallel to the axis of rotation L. However, this is not necessarily the case; on the contrary, the walls of an outlet duct 145 and of a passage opening 90, 95, 100 and 105 may also not run parallel to the axis of rotation L and/or may run in a staggered manner in relation thereto and/or obliquely.

As shown here, the passage openings 90, 95, 100 and 105 are spaced apart uniformly radially from one another. Alternatively, it is possible to distribute the passage openings 90, 95, 100 and 105 radially non-uniformly over the second disk 85. Furthermore, it is possible, instead of the circular cross section, to provide a cross section in the manner of a segment of a circle for one or all passage openings 90, 95, 100 and 105 and to design said passage openings in each case as an elongated hole.

Figure 2A:
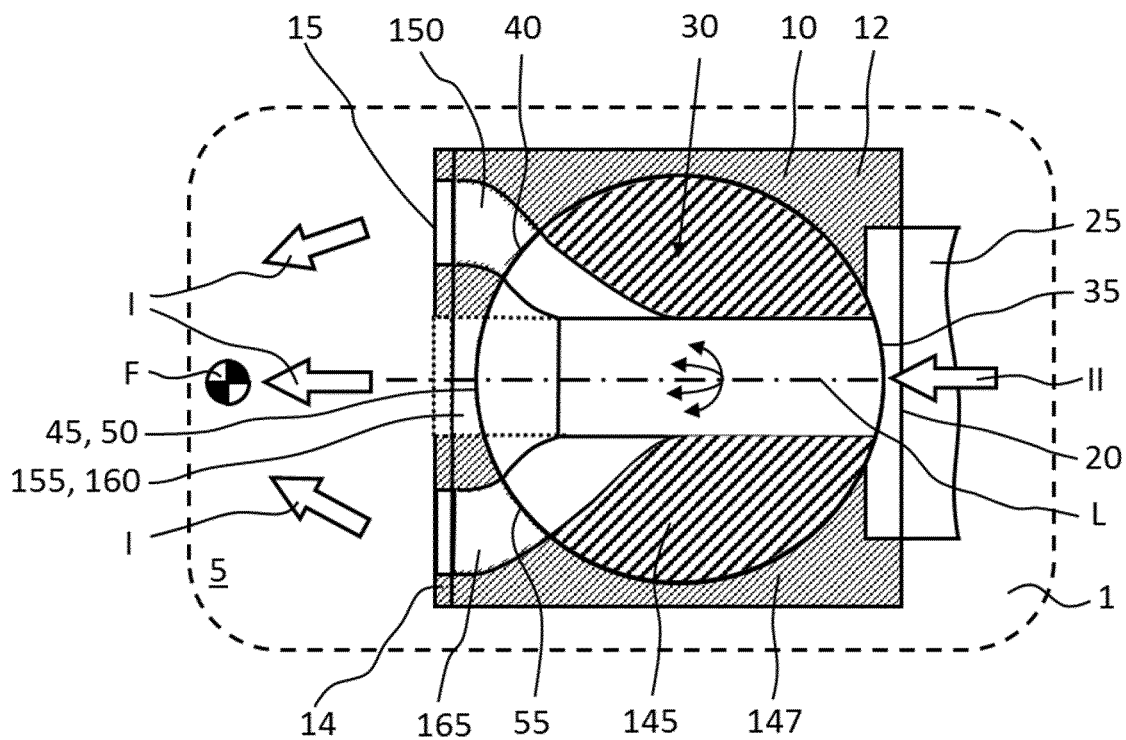
FIG. 2A is a symbolic sectional view through a motor vehicle according to the invention which is equipped with a second embodiment of an air vent according to the invention.

FIG. 2A shows an alternative embodiment of an air vent 10 in a longitudinal sectional illustration. The adjuster 30 here is essentially formed with a spherical surface or a spherical body 145 and is mounted in a bearing shell 147 so as to be rotatable in any direction in space.

On its right side in FIG. 2A, the adjuster 30 has an entry 35 which, according to the embodiment shown here, is adjacent to the inlet opening 20 and is fluidically connected thereto. An incoming airflow II can flow in through said inlet opening, the incoming airflow comprising air which has been air-conditioned or has not been air-conditioned and which is transported from an air-conditioning system (not shown here) or HVAC device and/or a fan (not shown here) in the direction of the air vent 10. A right housing cover 13 that is known from FIG. 1A is not provided according to this embodiment. A left housing cover 14 which is likewise known from FIG. 1A is provided according to this embodiment, but may, if desired, also be omitted.

In principle, the adjuster 30 can have at least two exits, out of which a respective open air jet I can flow. However, according to the exemplary embodiment shown in FIG. 2A, the adjuster 30 has, on the left side, four exits 40, 45, 50 and 55, of which the exits 45 and 50 are located on the other side and on this side respectively of the plane of the paper. The air vent 10 is provided with openings or outlet ducts 150, 155, 160 and 165 which have an outlet opening 15 at their ends which are in each case depicted on the left in FIG. 2A. At their corresponding right ends, they are arranged adjacent to the adjuster 30. Depending on a desired focal point F, the adjuster 30 is rotated in the air vent 10 in such a manner that at least one of the exits 40, 45, 50 and 55 is entirely, partially or not at all in fluidic connection with at least one of the outlet ducts 150, 155, 160 and 165. Consequently, the incoming airflow II is distributed in a suitable manner to one or more outlet ducts 150, 155, 160 and 165 in order to flow as the airflow I out of the air vent 10 in the direction of the motor vehicle interior 5.

The adjuster 30 shown here is in the form of a substantially complete sphere. However, this is not necessarily the case; a hemisphere formed with an entry 35 and exits 40, 45, 50 and 55 or a corresponding spherical section may also be mounted in the housing 12 so as to be rotatable in each direction in space.

Figure 2B:
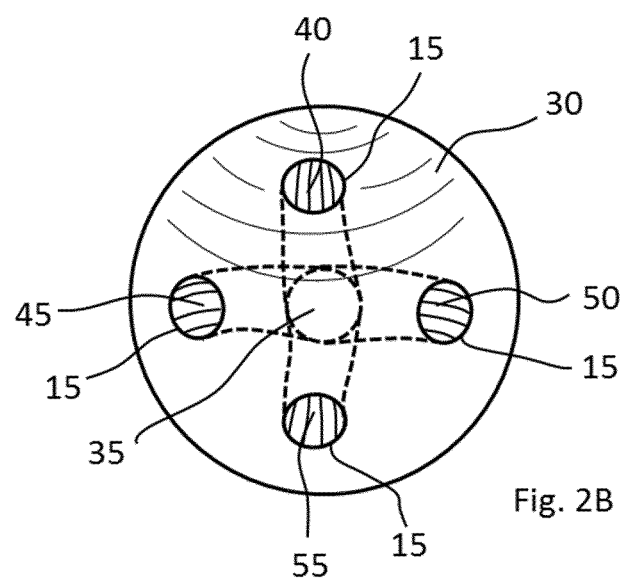
FIG. 2B illustrates a perspective top view of a component of the air vent shown in FIG. 2A.

FIG. 2B shows the adjuster 30 itself, which is illustrated in FIG. 2A, once again in a front view. Each of the exits 40, 45, 50 and 55 has a substantially circular cross section on the surface of the adjuster 30, said cross section substantially corresponding to the corresponding cross sections of the outlet ducts 150, 155, 160 and 165. Alternatively, it can be provided that the exit or the exits 40, 45, 50 and 55 and respectively corresponding outlet ducts 150, 155, 160 and 165 have a cross section which is substantially in the manner of a segment of a circle and are in the form of an elongated hole. The exits 40, 45, 50 and 55 shown here are distributed irregularly over the adjuster; alternatively, said exits may be arranged regularly, i.e. at a uniform spacing from one another.

Figure 3A:
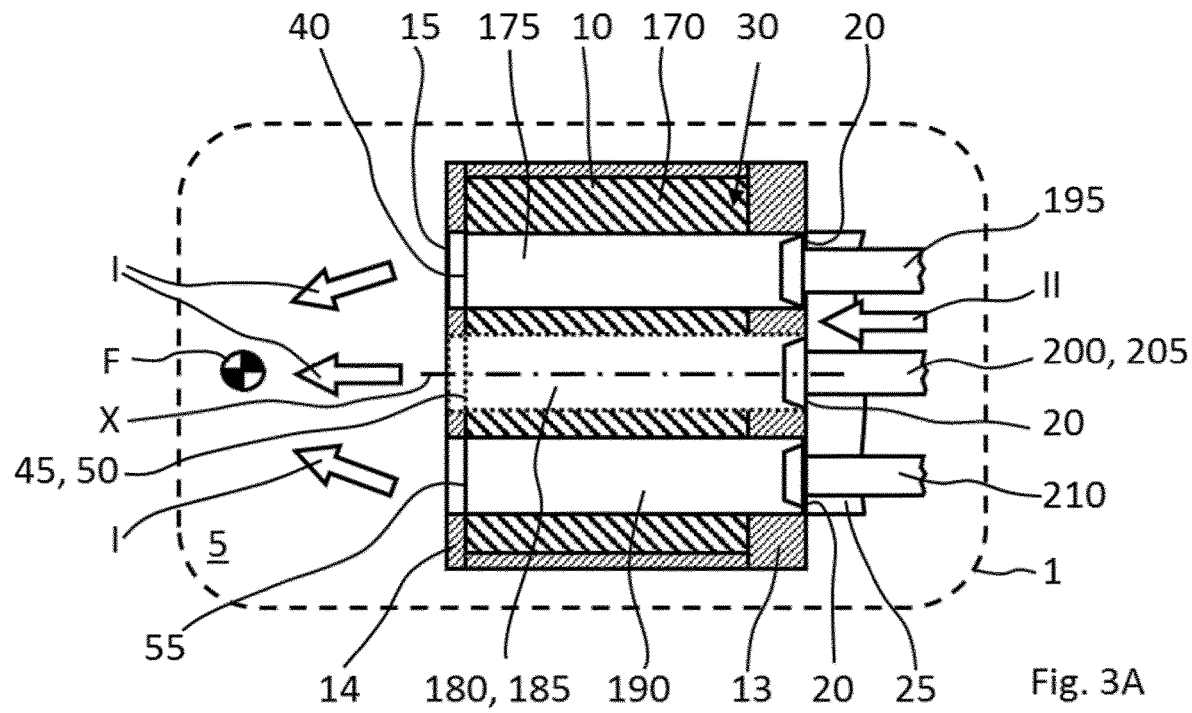
FIG. 3A is a symbolic sectional view through a motor vehicle according to the invention which is equipped with a third embodiment of an air vent according to the invention.

FIG. 3A shows an alternative embodiment of an air vent 10 in a longitudinal sectional illustration. The adjuster 30 here has an immovable body 170 with at least two exits, four exits 40, 45, 50 and 55 according to this exemplary embodiment, which are provided with outlet openings located in a housing cover 14. The four exits 40, 45, 50 and 55 furthermore correspond to in each case one duct 175, 180, 185 and 190 that is operatively connected in the region of the inlet opening 20 to a common entry duct 25.

The exit 45 and the duct 175 are located on the other side of the plane of the paper, the exit 50 and the duct 180 on this side of the plane of the paper. The adjuster 30 furthermore in each case has a closure which is in the form of a tappet 195, 200, 205 or 210, wherein the tappet 195 is located in the duct 175, the tappet 200 in the duct 180, the tappet 205 in the duct 185 and the tappet 210 in the duct 190. The tappets 195, 200, 205 and 210 can be moved in a translatory and/or rotary manner by means of a movement device (not shown here), for example by means of a device acting electromagnetically on said tappets, and therefore the entry openings 20 of the ducts 175, 180, 185 and 190 are optionally entirely, partially or not opened up or closed.

In the operating state shown in FIG. 3A, all of the entry openings 20 are illustrated in closed form, i.e. the tappets 195, 200, 205 and 210 fluidically seal off the ducts 175, 180, 185 and 190. In the event of a tappet 195, 200, 205 or 210 shifting (not shown here) to the right in FIG. 3A, the entry openings 20 would be opened and the incoming airflow II would pass through the respectively opened up duct 175, 180, 185 or 190 in order to exit from the exits 40, 45, 50 and 55 in the form of the airflow I in the direction of the focal point F.

It goes without saying that the housing cover 13 and/or housing cover 14 may also be dispensed with in this exemplary embodiment if in particular the exits 40, 45, 50 and 55 are functionally integrated in the housing 12.

Figure 3B:
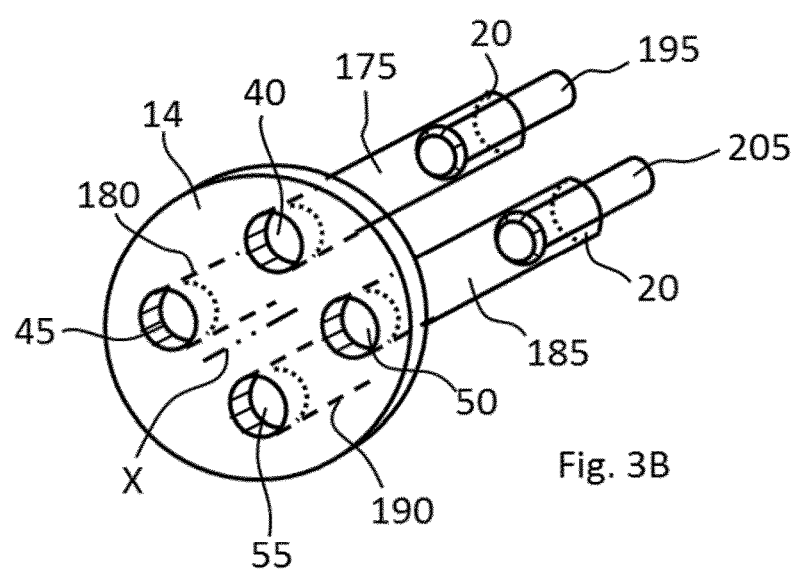
FIG. 3B illustrates a perspective top view of various components of the air vent shown in FIG. 3A.

FIG. 3B shows the adjuster 30 itself, which is illustrated in FIG. 3A, once again partially in a perspective front view. Each of the exits 40, 45, 50 and 55 has a substantially circular cross section on the surface of the adjuster 30, said cross section substantially corresponding to corresponding cross sections of the ducts 175, 180, 185 and 190. Alternatively, it can be provided that the exit or the exits 40, 45, 50 and 55 and respectively corresponding ducts 175, 180, 185 and 190 have a cross section which is substantially in the manner of a segment of a circle and are designed as an elongated hole. The exits 40, 45, 50 and 55 shown here are distributed irregularly over the adjuster 30; alternatively, they can be arranged regularly, i.e. at an identical distance from one another.

The walls of the exits 40, 45, 50 and 55 run within the housing cover 14 substantially parallel to the longitudinal axis X of the air vent 10. However, this is not necessarily the case; on the contrary, said walls may also not run parallel to the longitudinal axis X and/or may run in a staggered manner in relation thereto and/or obliquely. In principle, the exits 40, 45, 50 and 55 can be oriented uniformly spaced apart radially from one another. As can be gathered from the exemplary embodiment according to FIG. 3B, it is, however, also possible to distribute the exits 40, 45, 50 and 55 non-uniformly. Furthermore, it is possible to provide a cross section in the manner of a segment of a circle instead of the circular cross section of one or all of the exits 40, 45, 50 and 55.

Figure 4A:
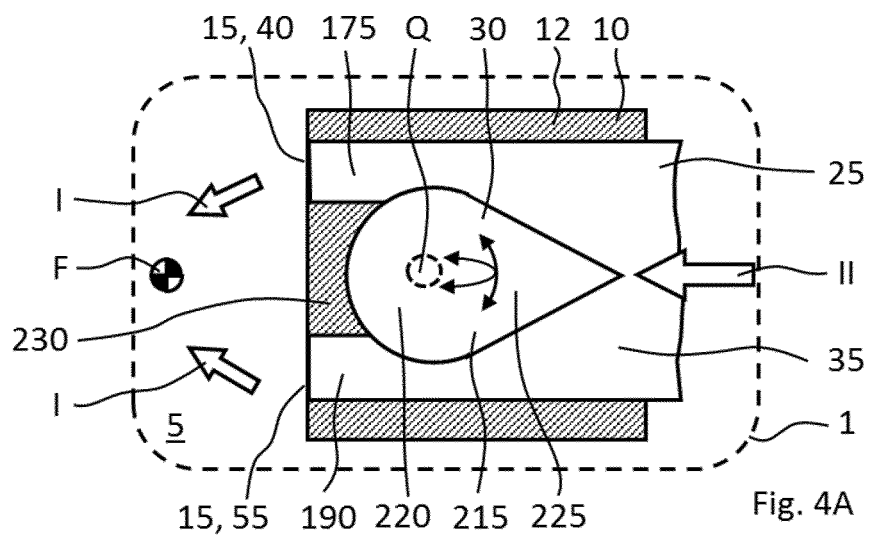
FIGS. 4A and 4B are symbolic sectional views through a motor vehicle according to the invention which is equipped with a fourth embodiment of an air vent according to the invention, which air vent is shown in two different operating states.

FIG. 4A shows an alternative embodiment of an air vent 10 in a schematic longitudinal sectional illustration. Here, the adjuster 30 has a flow body 215 with a base section 220 positioned downstream and an incident flow section 225 which is positioned upstream and tapers in this direction. The base section 220 is designed to be movable in relation to a bearing section 230 in all directions in space. According to a particularly preferred embodiment, the base section 220 is mounted pivotably about a pivot axis Q which is indicated here and which, for its part, is accommodated in the bearing section 230. The bearing section 230 is arranged in the housing 12 of the air vent 10 in such a manner that the incoming air duct 25 has a no longer completely symmetrical cross section downstream, as a result of which the incoming airflow II is divided into different airflows or open jets I. The base section 220, in the event that it is mounted so as to be pivotable solely about the pivot axis Q forms an upper exit 40 in FIG. 4A and a lower exit 55, said exits each forming an outlet opening 15. However, it should also be noted that more than two exits 40, 55 can also be provided, wherein the base section 220 is mounted movably in all directions in space, in particular by means of a spherical bearing (not shown).

The air vent 10 shown in FIG. 4A is in an operating state in which an incoming airflow II entering the entry 35 in the direction of the adjuster 30 is divided into two partial airflows. The incoming airflow II can comprise air which has been air-conditioned or which has not been air-conditioned and which is transported from an air-conditioning system (not shown here) or HVAC device and/or from a fan (not shown here) in the direction of the air vent 10. The divided incoming airflow II exits in the form of two airflows II through the exits 40 and 55 and the outlet openings 15, consequently from the air vent 10, in such a manner that they meet as open jets at a focal point F.

Figure 4B:
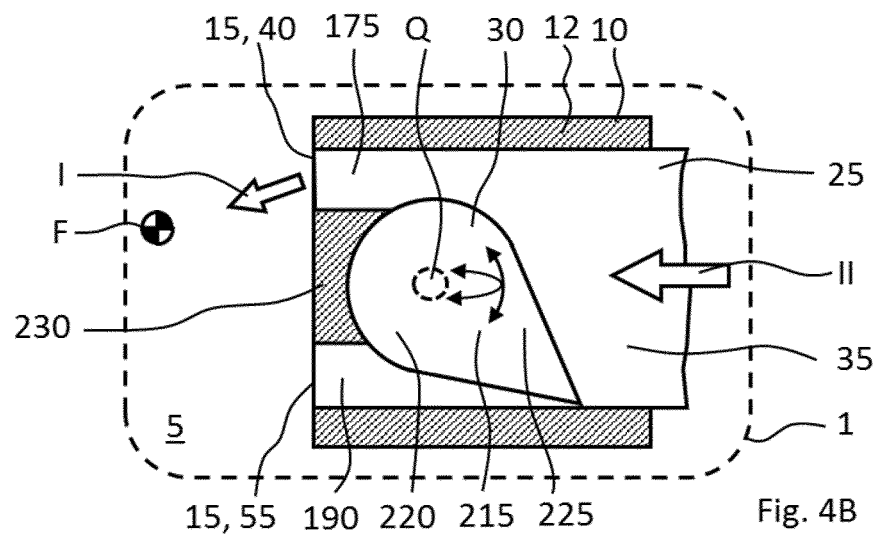

According to FIG. 4B, the air vent 10 which is shown in FIG. 4A is in an operating state in which the lower exit 55 is fluidically closed by the adjuster 30. For this purpose, the adjuster 30 is pivoted about the pivot axis Q in such a manner that the incident flow section 225 lies substantially tightly against the inner wall of the housing 12 such that a division into two of the incoming airflow II is avoided. For this purpose, the cross section of the duct-like interior is designed in an advantageous manner to be rectangular, particularly preferably square. The incoming airflow II is conducted completely from the exposed surface of the incident flow section 225, the base section 220 and of the bearing section 230 in the direction of the upper exit 40 in FIG. 4B or the upper outlet opening 15 in FIG. 4B. The airflow I leaves the air vent 10 here in such a manner that it flows as a single air jet in the direction of the focal point F and sweeps over the latter.

As can easily be seen, the number of the open jets I, the respective volumetric flow and direction thereof can be adjusted by suitable adjustment of the adjuster 30, consequently suitable pivoting of the adjuster 30 about the pivot axis Q.

Figure 4C:
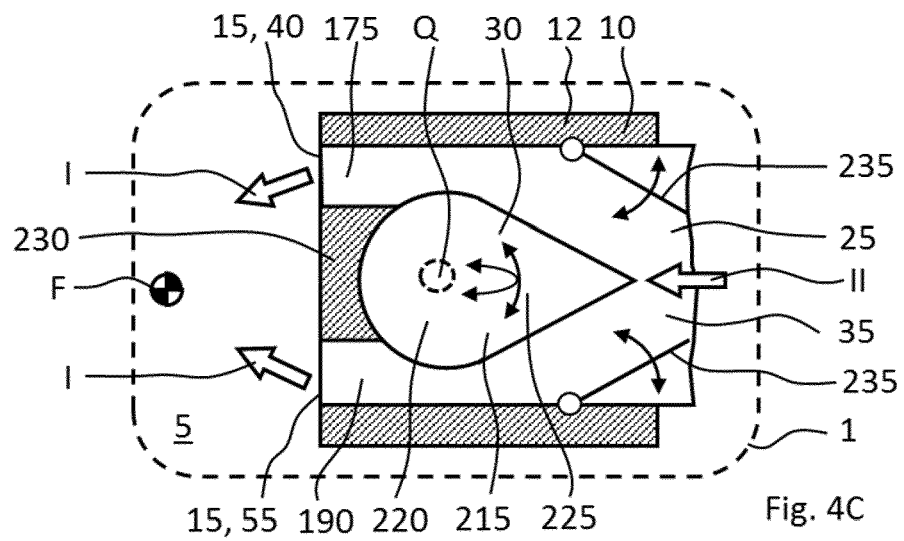
FIG. 4C illustrates a development of the embodiment shown in FIG. 4A.

In principle, the air vent 10 illustrated in FIG. 4A is shown once again in FIG. 4C. Furthermore, the air vent 10 according to FIG. 4C has guiding surfaces 235, which are in the form of walls, in the incoming air duct 25, with which guiding surfaces the number, the volumetric flow or the direction of the open jet I or of the open jets I can be changed. The air-guiding surfaces 235 are each mounted in a rotationally pivotable manner on the housing 12 and upstream of the pivot axis Q and, corresponding to the operating state of the air vent 10 that is shown in FIG. 4C, are in each case half pivoted into the incoming air duct 25. Depending on a desired focal point F, the adjuster 30 and/or one or both guiding surfaces 235 are rotated into the duct-like interior of the air vent 10 or out of the latter in such a manner that at least one open jet I can exit from at least one of the exits 40 or 55.

Figure 5A:
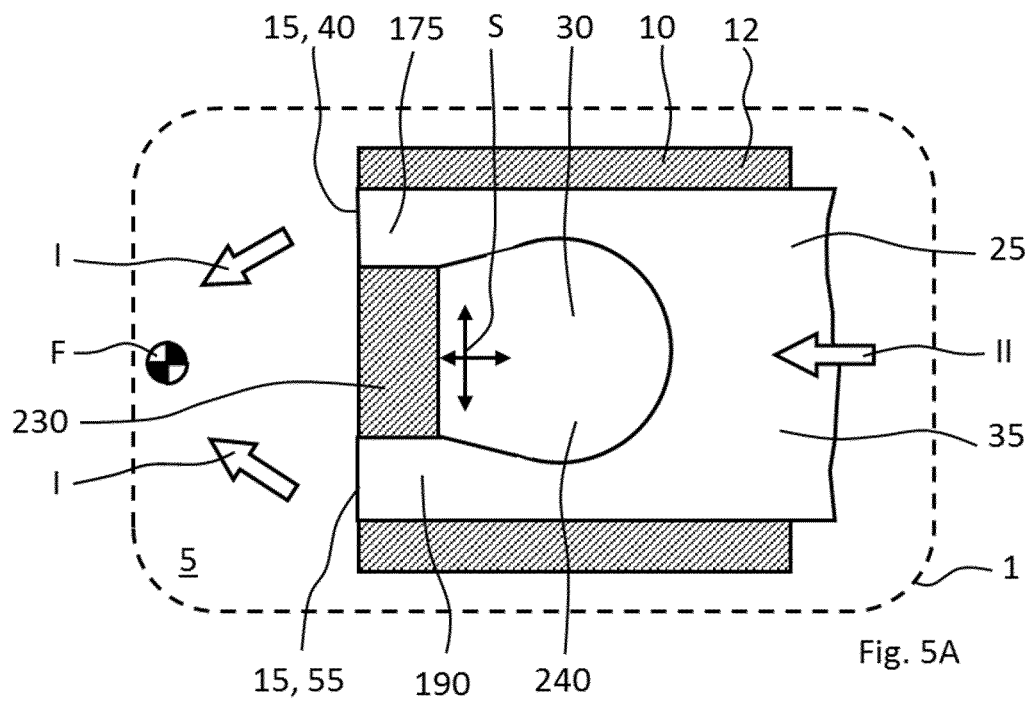
FIGS. 5A and 5B are symbolic sectional views through a motor vehicle according to the invention which is equipped with a fifth embodiment of an air vent according to the invention, which air vent is shown in two different operating states.

FIG. 5A shows an alternative embodiment of an air vent 10 in a schematic longitudinal sectional illustration. The adjuster 30 here has a dome 240 which is formed on a bearing section 230 so as to be displaceable in all three directions in space, preferably in a plane orthogonal to the incoming air duct 25, particularly preferably along a translation axis S in the direction of the inner walls of the housing 12. Consequently, the incoming air duct 25 has a cross section which is no longer completely symmetrical, as a result of which the incoming airflow II is divided into different airflows or open jets I. According to the embodiments shown in FIGS. 5A and 5B, the bearing section 230 is arranged in the housing 12 of the air vent 10 in such a manner that the incoming air duct 25 is divided downstream into an upper exit 40 in FIG. 5A and a lower exit 55, which exits each form an outlet opening 15. However, it should be once again noted that more than two exits 40, 55 can also be provided. In particular, it is possible to provide two further outlets (not shown) which, in principle, are arranged in the manner of the outlets 45 and 50 described according to FIG. 1A. In this case, the dome 240 is mounted on the bearing section 230 so as not only to be movable in the vertical direction, shown in FIGS. 5A and 5B, but also perpendicularly thereto (or orthogonally with respect to the plane of the paper).

The air vent 10 shown in FIG. 5A is in an operating state in which an incoming airflow II entering through the entry 35 in the direction of the adjuster 30 is divided into two partial airflows. The incoming airflow II can comprise air which has been air-conditioned or which has not been air-conditioned and which is transported from an air-conditioning system (not shown here) or HVAC device and/or a fan (not shown here) in the direction of the air vent 10. The divided incoming airflow II exits in the form of two airflows I through the exits 40 and 55 and the outlet openings 15, consequently out of the air vent 10, in such a manner that they meet as open jets at a focal point F.

Figure 5B:
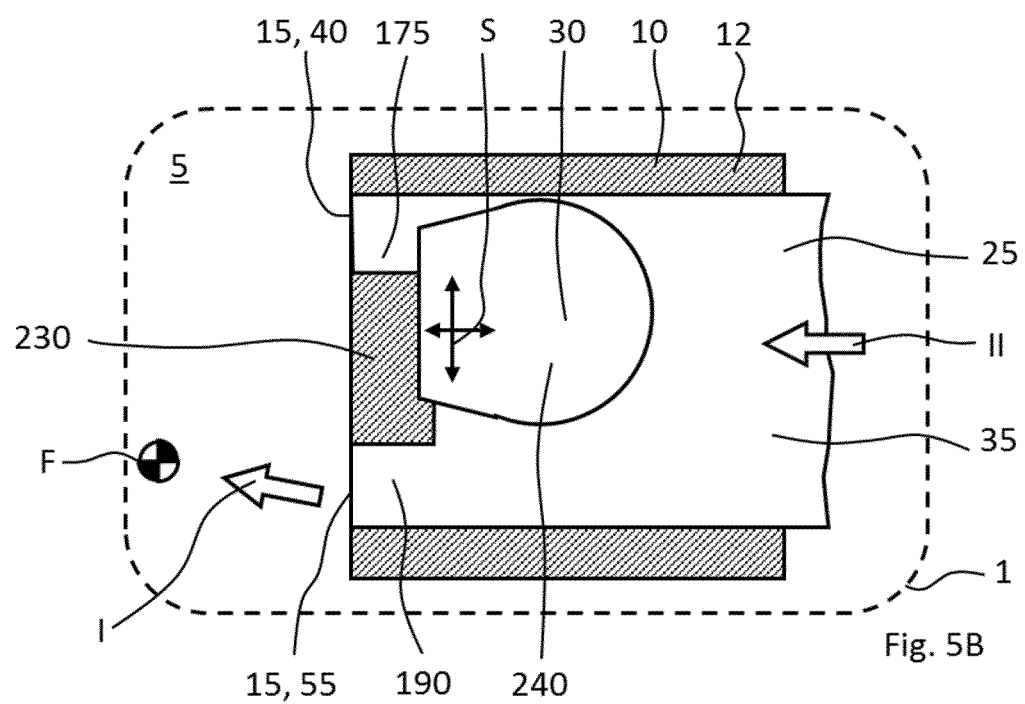

According to FIG. 5B, the air vent 10 which is shown in FIG. 5A is in an operating state in which the upper exit 40 is fluidically closed by the adjuster 30. For this purpose, the adjuster 30 is moved along the translation axis S in such a manner that the dome 240 lies tightly against the inner wall of the housing 12, and therefore a division into two of the incoming airflow II is avoided. The incoming airflow II is guided completely by the exposed dome 240 and the bearing section 230 in the direction of the lower exit 55 in FIG. 5B or the lower outlet opening 15 in FIG. 4B. The airflow I leaves the air vent 10 here in such a manner that it flows as a single air jet in the direction of the focal point F and sweeps over the latter.

As can easily be seen, the number of open jets I and the respective volumetric flow and direction thereof can be adjusted by suitable adjustment of the adjuster 30, consequently suitable translation of the adjuster 30 about the translation axis S.

It should be noted that the exits 40, 45, 50 and 55 shown previously in the respective exemplary embodiments have been described as oriented substantially parallel to one another. However, it is also possible in an advantageous manner not to orient one, some or all of the exits 40, 45, 50 and 55 parallel to one another. It is thus possible in a particularly advantageous manner to orient some or all of the exits 40, 45, 50 and 55 with respect to one another such that a movement of the open jet or of the open jets I with respect to one another is assisted. This is all the more so if the passage openings 90, 95, 100, 105, the exit ducts 150, 155, 160, 165 and the ducts 175, 180, 185, 190 are likewise oriented with respect to one another at their respective ends.

LIST OF DESIGNATIONS

1 Motor vehicle
5 Motor vehicle interior
10 Air vent
12 Housing
13 Housing cover
14 Housing cover
15 Outlet opening
20 Inlet opening
25 Incoming air duct
30 Adjuster
35 Entry
40 Exit
45 Exit
50 Exit
55 Exit
60 First disk
65 Passage opening
70 Passage opening
75 Passage opening
80 Passage opening
85 Second disk
90 Passage opening
95 Passage opening
100 Passage opening
105 Passage opening
110 Third disk
115 Passage opening
120 Passage opening
125 Passage opening
130 Passage opening
135 Inlet duct
140 Passage duct
145 Body
147 Bearing shell
150 Outlet duct
155 Outlet duct
160 Outlet duct
165 Outlet duct
170 Body
175 Duct
180 Duct
185 Duct
190 Duct
195 Tappet
200 Tappet
205 Tappet
210 Tappet
215 Flow body
220 Base section
225 Incident flow section
230 Bearing section
235 Guiding surfaces
240 Dome
F Focal point
L Axis of rotation
Q Pivot axis
S Translation axis
X Longitudinal axis
I Airflow
II Incoming airflow

What is claimed is:

1. An air vent for introducing air into a motor vehicle interior, comprising:
    an inlet opening, through which an incoming airflow enters the air vent;
    an outlet opening, through which an airflow exits the air vent; and
    an adjuster, which is operatively connected fluidically to the inlet opening and to the outlet opening, wherein
    the adjuster has at least one entry, which is operatively connected fluidically to the inlet opening,
    the adjuster has at least two spaced-apart exits, from each of which an open air jet exits into the outlet opening,
    the adjuster is configured to align the open air jets with a focal point, and
    the adjuster is configured to be located outside a field of view from the motor vehicle interior, wherein
    the adjuster has a first disk, with first passage openings of the first disk forming the at least one entry and spaced-apart radially from one another, and a second disk which is adjacent to said first disk, with spaced-apart second passage openings of the second disk forming the at least two spaced apart exits,
    the first disk and/or the second disk are mounted rotatably about a common axis in such a manner that at least one of the first passage openings are arranged optionally in alignment, partially in alignment or not in alignment with at least one of the second passage openings,
    between the first disk and the second disk, a third disk having third passage openings spaced-apart radially from one another is mounted about the common axis, in such a manner that at least one of the third passage openings is arranged optionally in alignment, partially in alignment or not in alignment with at least one of the first passage openings and/or at least one of the second passage openings.

2. The air vent according to claim 1, wherein
    the first disk is operatively connected to an inlet duct which is located upstream and has the inlet opening, and
    the second disk is operatively connected downstream to an outlet duct having the outlet opening.

3. The air vent according to claim 1, wherein at least one of:
    at least one of the first passage openings has a first longitudinal profile running in the longitudinal direction of the first disk,
    at least one of the second passage openings has a second longitudinal profile running in the longitudinal direction of the second disk, or
    at least one of the third passage openings has a third longitudinal profile running in the longitudinal direction of the third disk.

4. A motor vehicle comprising at least one air vent according to claim 1.

5. An air vent for introducing air into a motor vehicle interior, comprising:
    an inlet opening, through which an incoming airflow enters the air vent;
    an outlet opening, through which an airflow exits the air vent; and
    an adjuster, which is operatively connected fluidically to the inlet opening and to the outlet opening, wherein
    the adjuster has at least one entry, which is operatively connected fluidically to the inlet opening,
    the adjuster has at least two spaced-apart exits, from each of which an open air jet exits into the outlet opening, the adjuster is configured to align the open air jets with a focal point, and the adjuster is configured to be located outside a field of view from the motor vehicle interior, wherein the adjuster has a first disk, with first passage openings of the first disk forming the at least one entry and spaced-apart radially from one another, and a second disk which is adjacent to said first disk, with spaced-apart second passage openings of the second disk forming the at least two spaced apart exits, the first disk and/or the second disk are mounted rotatably about a common axis in such a manner that at least one of the first passage openings are arranged optionally in alignment, partially in alignment or not in alignment with at least one of the second passage openings, the first passage openings and the second passage openings form ducts extending in an axial direction, wherein at least one of the first passage openings is shaped differently than at least one of the second passage openings.

6. An air vent for introducing air into a motor vehicle interior, comprising:

an inlet opening, through which an incoming airflow enters the air vent;

an outlet opening, through which an airflow exits the air vent; and an adjuster, which is operatively connected fluidically to the inlet opening and to the outlet opening, wherein the adjuster has at least one entry, which is operatively connected fluidically to the inlet opening, the adjuster has at least two spaced-apart exits, from each of which an open air jet exits into the outlet opening, the adjuster is configured to align the open air jets with a focal point, and the adjuster is configured to be located outside a field of view from the motor vehicle interior, wherein the adjuster has a body, wherein the at least one entry and the at least two exits are spaced apart and located on an outer side of the body, the at least one entry is fluidically connected to the at least two exits by way of an outlet duct located in the body, and at least a part of the outer side of the body is formed spherically and is mounted pivotably in a bearing shell in such a manner that the at least two exits of the body and openings located in the bearing shell are arranged optionally in alignment, partially in alignment or not in alignment with one another.

7. An air vent for introducing air into a motor vehicle interior, comprising:

an inlet opening, through which an incoming airflow enters the air vent;

an outlet opening, through which an airflow exits the air vent; and an adjuster, which is operatively connected fluidically to the inlet opening and to the outlet opening, the adjuster has at least two spaced-apart exits, from each of which an open air jet exits into the outlet opening, the adjuster is configured to align the open air jets with a focal point, and the adjuster is configured to be located outside a field of view from the motor vehicle interior, wherein the adjuster comprises a body having at least two entries, wherein each of the at least two entries is connected fluidically to a respective one of the at least two exits, and at least one of the at least two entries has a closure which, optionally, entirely or partially opens and closes the at least one of the at least two entries.

8. The air vent according to claim 7, wherein the closure is in the form of a tappet.

9. An air vent for introducing air into a motor vehicle interior, comprising:

an inlet opening, through which an incoming airflow enters the air vent;

at least one outlet opening, through which an airflow exits the air vent; and an adjuster, which is operatively connected fluidically to the inlet opening and to the at least one outlet opening, wherein the adjuster has at least one entry, which is operatively connected fluidically to the inlet opening, the adjuster has at least two spaced-apart exits, from each of which an open air jet exits into the at least one outlet opening, the adjuster is configured to align the open air jets with a focal point, and the adjuster is configured to be located outside a field of view from the motor vehicle interior, the adjuster has at least two radially spaced-apart exit ducts and a flow body which is located upstream with respect to the at least two exit ducts and which is configured to, optionally, entirely, partially or not direct the incoming airflow to at least one of the at least two exit ducts, and the flow body is configured to be movable relative to a bearing section in a translatory and rotary manner.

10. The air vent according to claim 9, wherein the flow body has a wider base section downstream that tapers toward a narrower incident flow section upstream.

11. The air vent according to claim 9, wherein the flow body is at least partially surrounded by a duct having at least one movable wall.

12. An air vent for introducing air into a motor vehicle interior, comprising:

an inlet opening, through which an incoming airflow enters the air vent;

at least one outlet opening, through which an airflow exits the air vent; and an adjuster, which is operatively connected fluidically to the inlet opening and to the at least one outlet opening, wherein the adjuster has at least one entry, which is operatively connected fluidically to the inlet opening, the adjuster has at least two spaced-apart exits, from each of which an open air jet exits into the at least one outlet opening, the adjuster is configured to align the open air jets with a focal point, and the adjuster is configured to be located outside a field of view from the motor vehicle interior, the adjuster has at least two radially spaced-apart exit ducts and a flow body which is located upstream with respect to the at least two exit ducts and which is configured to, optionally, entirely, partially or not direct the incoming airflow to at least one of the at least two exit ducts, the flow body is configured with a dome located upstream and a bearing section located downstream, wherein the dome of the flow body is displaceable transversely with respect to the flow direction of the incoming airflow.

* * * * *